(12) United States Patent
Kawaguchi et al.

(10) Patent No.: US 12,436,128 B2
(45) Date of Patent: Oct. 7, 2025

(54) PERACETIC ACID CONCENTRATION METER

(71) Applicant: HORIBA Advanced Techno, Co., Ltd., Kyoto (JP)

(72) Inventors: Yoshihiko Kawaguchi, Kyoto (JP); Satoko Kai, Kyoto (JP)

(73) Assignee: HORIBA Advanced Techno, Co., Ltd., Kyoto (JP)

( * ) Notice: Subject to any disclaimer, the term of this patent is extended or adjusted under 35 U.S.C. 154(b) by 741 days.

(21) Appl. No.: 17/637,545

(22) PCT Filed: Aug. 12, 2020

(86) PCT No.: PCT/JP2020/030658
§ 371 (c)(1),
(2) Date: Feb. 23, 2022

(87) PCT Pub. No.: WO2021/039393
PCT Pub. Date: Mar. 4, 2021

(65) Prior Publication Data
US 2022/0283112 A1    Sep. 8, 2022

(30) Foreign Application Priority Data
Aug. 28, 2019    (JP) ................. 2019-155838

(51) Int. Cl.
*G01N 27/404*    (2006.01)
*G01N 27/416*    (2006.01)

(52) U.S. Cl.
CPC ......... *G01N 27/404* (2013.01); *G01N 27/416* (2013.01)

(58) Field of Classification Search
CPC ............ G01N 27/404; G01N 27/416
See application file for complete search history.

(56) References Cited

U.S. PATENT DOCUMENTS

| | | |
|---|---|---|
| 5,770,039 A | 6/1998 | Rigney et al. |
| 2015/0014244 A1 | 1/2015 | Shimura et al. |

(Continued)

FOREIGN PATENT DOCUMENTS

| | | |
|---|---|---|
| CN | 104136105 A | 11/2014 |
| CN | 104280351 A | 1/2015 |

(Continued)

OTHER PUBLICATIONS

English Translation of WO-2016194596, Dec. 8, 2016.*

(Continued)

*Primary Examiner* — Jill A Warden
*Assistant Examiner* — Michael Stanley Gzybowski
(74) *Attorney, Agent, or Firm* — Alleman Hall & Tuttle LLP

(57) ABSTRACT

There is provided a peracetic acid concentration meter that inhibits contamination of a working electrode surface by organic material, and makes it possible to measure a peracetic acid concentration more accurately than is possible conventionally. The present invention is a diaphragm-type peracetic acid concentration meter that measures a peracetic acid concentration in a test solution and is characterized in being provided with a diaphragm that is permeable to peracetic acid, an internal solution in which peracetic acid that has permeated through the diaphragm is dissolved, a working electrode and a counter electrode that are immersed in the internal solution, and a permeation-inhibiting layer that is laminated onto a surface of the diaphragm on a side thereof that is in contact with the test solution, and that inhibits permeation of organic material.

5 Claims, 5 Drawing Sheets

(56) References Cited

U.S. PATENT DOCUMENTS

2016/0243503 A1    8/2016  Okabe et al.
2018/0311623 A1   11/2018  Okabe et al.

FOREIGN PATENT DOCUMENTS

| | | | | |
|---|---|---|---|---|
| CN | 105277600 | A | 1/2016 | |
| CN | 105611994 | A | 5/2016 | |
| CN | 108348869 | A | 7/2018 | |
| EP | 3032246 | A1 | 6/2016 | |
| JP | H06192145 | A * | 7/1994 | ........... B01D 69/127 |
| JP | 2001235443 | A | 8/2001 | |
| JP | 2015230172 | A | 12/2015 | |
| JP | 2015230173 | A | 12/2015 | |
| JP | 2018189444 | A | 11/2018 | |
| JP | 2019098330 | A | 6/2019 | |
| WO | 2016035377 | A1 | 3/2016 | |
| WO | WO-2016194596 | A1 * | 12/2016 | ......... A61B 1/00057 |

OTHER PUBLICATIONS

English Translation of JP H06-192145, Jul. 12, 1994.*
ISA Japan Patent Office, International Search Report Issued in Application No. PCT/JP2020/030658, Sep. 29, 2020, WIPO, 6 pages.
China National Intellectual Property Administration, Office Action Issued in Application No. 202080059956.2, Apr. 15, 2024, 17 pages.
China National Intellectual Property Administration, Notification to Grant Patent Right Issued for Patent Application No. 202080059956.2, Jan. 13, 2025, 6 pages.
China National Intellectual Property Administration, Office Action and Search Report Issued in Application No. 202080059956.2, Oct. 31, 2024, 12 pages.

* cited by examiner

PERACETIC ACID CONCENTRATION METER

TECHNICAL FIELD

The present invention relates to a peracetic acid concentration meter that measures a concentration of peracetic acid contained in a test solution.

TECHNICAL BACKGROUND

A diaphragm type of peracetic acid concentration meter such as that described, for example, in Patent Document 1 is conventionally known.

This diaphragm type of peracetic acid concentration meter is provided with a diaphragm that is selectively permeable to peracetic acid, and measures changes in current that are generated when peracetic acid that has permeated through this diaphragm reacts at a surface of a working electrode.

However, there are cases in which food or human-derived organic material is contained in a peracetic acid solution that is serving as a measurement subject and, depending on conditions, there are cases in which a portion of the organic material permeates through the diaphragm so as to become mixed into the interior liquid and reach the surface of the working electrode.

The organic material that reaches the surface of the working electrode adheres to the working electrode, and problems such as this organic material obstructing the reaction of the peracetic acid at the surface of the acting electrode may occur.

DOCUMENTS OF THE PRIOR ART

Patent Documents

Patent Document 1 Japanese Unexamined Patent Application (JP-A) No. 2015-230173

DISCLOSURE OF THE INVENTION

Problems to be Solved by the Invention

The present invention was conceived in view of the above-described circumstances, and it is a principal object thereof to provide a peracetic acid concentration meter that inhibits contamination of a working electrode surface by organic material, and makes it possible to measure a peracetic acid concentration more accurately than is possible conventionally.

Means for Solving the Problem

In other words, a peracetic acid concentration meter according to the present invention is a diaphragm-type of peracetic acid concentration meter that measures a peracetic acid concentration in a test solution and is characterized in being provided with a diaphragm that is permeable to peracetic acid, an internal solution in which peracetic acid that has permeated through the diaphragm is dissolved, a working electrode and a counter electrode that are immersed in the internal solution, and a permeation-inhibiting layer that is laminated onto a surface of the diaphragm on a side thereof that is in contact with the test solution, and that inhibits permeation of organic material.

According to the peracetic acid concentration meter that is formed in this manner, because this peracetic acid concentration meter is provided with the permeation-inhibiting layer that is laminated onto a surface of the diaphragm on a side thereof that is in contact with a test solution, it is possible to inhibit permeation of organic material contained within the test solution into an internal solution.

As a result, because it is possible to inhibit contamination of a working electrode surface by organic material, and to thereby reduce any obstruction to a reaction of peracetic acid at the working electrode surface that might be caused by this contamination, it is possible to measure a peracetic acid concentration more accurately than is conventionally possible.

If the permeation-inhibiting layer is provided with a semipermeable membrane, then because it is possible to control the permeation rate by means of the molecular weight, it is possible to inhibit the permeation of organic material without obstructing the permeation of the peracetic acid.

If the permeation-inhibiting layer is provided with a supporting substrate that supports the semipermeable membrane, then there is no need to consider whether or not the compositions of the diaphragm and of the semipermeable membrane are mutually compatible, or to consider the strength of the semipermeable membrane, and a greater number of types of semipermeable membrane may be used.

For example, if the supporting substrate is laminated onto the surface of the diaphragm on the side thereof that is in contact with the test solution, and the semipermeable membrane is laminated onto a surface of the supporting substrate on the opposite side from the diaphragm, then even in a case in which, due to the nature of the semipermeable membrane, it is difficult to laminate the semipermeable membrane onto the surface of the diaphragm via a direct coating process, by interposing the supporting substrate, it becomes possible to laminate the permeation-inhibiting layer onto the surface of the diaphragm.

As a specific embodiment of the present invention, the semipermeable membrane may be a membrane containing one or more types of components selected from a group made up of cellulose, acetyl cellulose, polyacrylonitrile, polytetrafluoroethylene, polyester-based polymer alloys and polysulfones.

If a peracetic acid concentration measurement device that is provided with a light source that irradiates ultraviolet light onto a surface of the peracetic acid concentration meter that is in contact with the test solution is employed, then contamination of the surface of the permeation-inhibiting layer is inhibited, and it is possible to further improve the accuracy of the peracetic acid concentration measurement.

Effects of the Invention

According to the peracetic acid concentration meter of the present invention, contamination of the surface of a working electrode by organic material derived from a test solution is inhibited, and it is possible to measure a peracetic acid concentration more accurately than is conventionally possible.

DESCRIPTION OF THE REFERENCE NUMERALS

1 . . . Peracetic Acid Concentration Meter
4 . . . Working Electrode
5 . . . Counter Electrode
11 . . . Diaphragm
12 . . . Intermediate Membrane
13 . . . Internal Solution

BEST EMBODIMENTS FOR IMPLEMENTING THE INVENTION

Hereinafter, an embodiment of a peracetic acid concentration meter 1 according to the present invention will be described with reference to the drawings.

Figure 1:
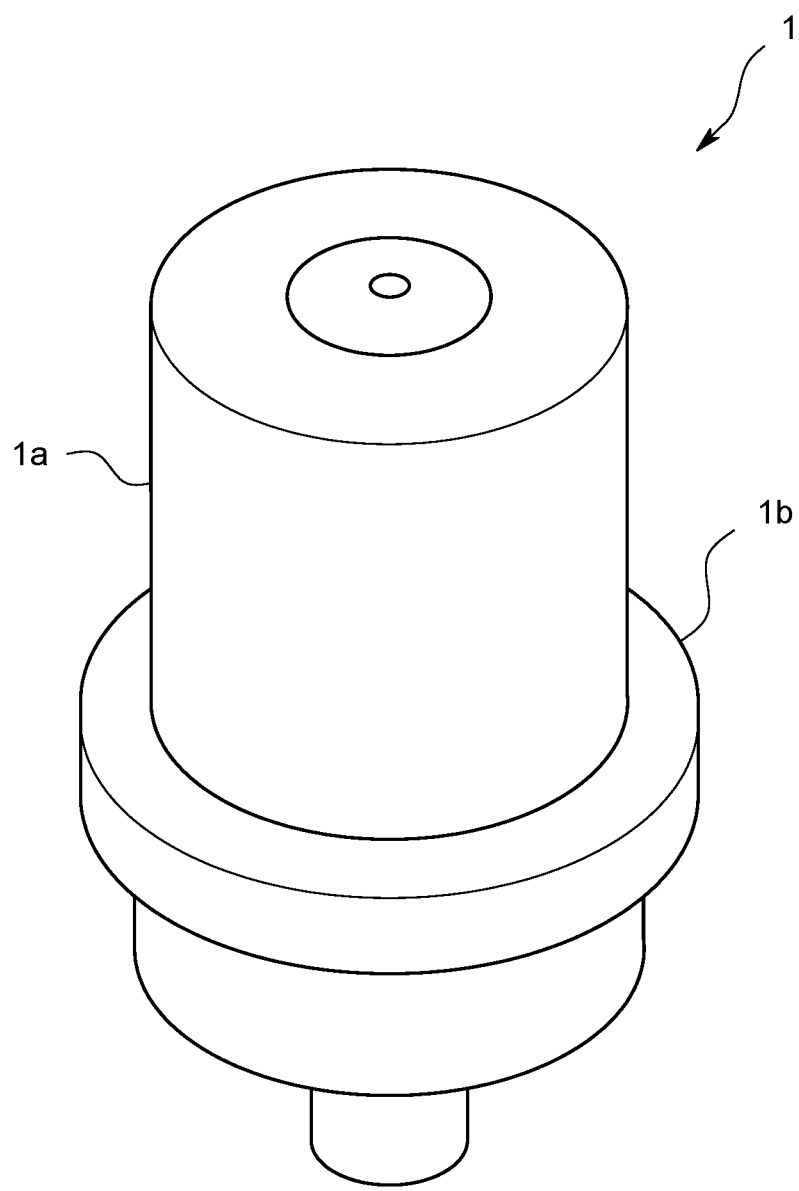
FIG. 1 is an overall schematic view of a peracetic acid concentration meter according to an embodiment of the present invention.
Figure 2:
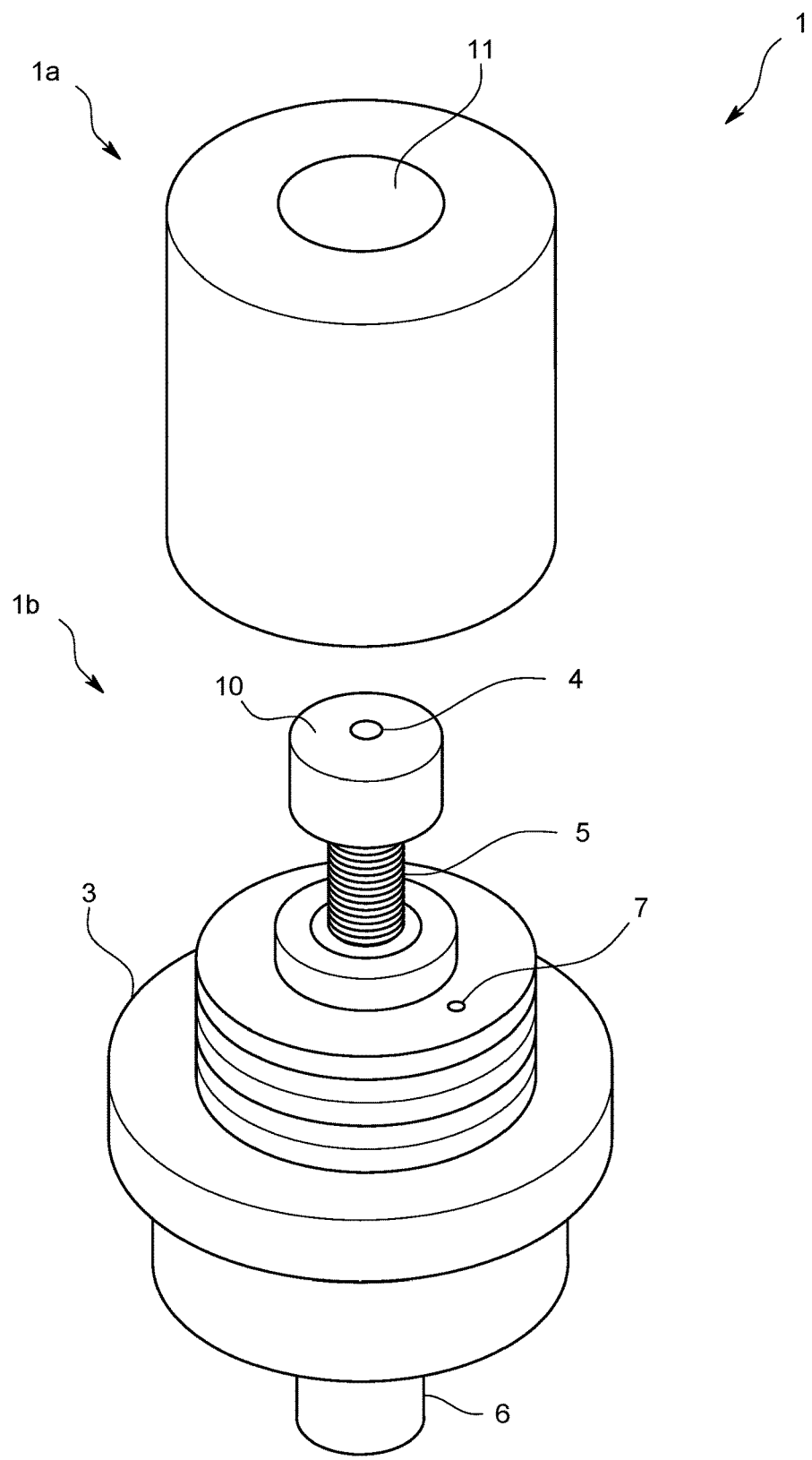
FIG. 2 is a schematic view of the peracetic acid concentration meter according to an embodiment of the present invention.

The peracetic acid concentration meter 1 of the present embodiment measures a peracetic acid concentration in a test solution by being immersed in this test solution. As is shown in FIG. 1 and FIG. 2, the peracetic acid concentration meter 1 is provided with a container 1a that contains an internal solution, and a lid portion 1b that seals the container 1a.

The container 1a is a hollow, circular cylinder-shaped component having one end surface that is open and another end surface that is closed. When the lid portion 1b is attached so as to close off the open end, a space is formed inside the container 1a that contains an internal solution 13. In addition, a screw thread (not shown in the drawings) that is used to attach the lid portion 1b is formed on an inner wall of the container 1a in the vicinity of this open end.

Moreover, a diaphragm 11 through which specific substances contained in the test solution are able to permeate and penetrate into the interior of the container 1a is provided at a portion of the other end surface.

The diaphragm 11 is permeable to peracetic acid, hydrogen peroxide, dissolved oxygen, and residual chlorine and the like that are contained in the test solution and is formed from a material containing, for example, silicon, fluorine resin, or polyethylene. Note that, for example, Teflon (registered trademark) or the like may be used as the fluorine resin. Furthermore, a diaphragm having a membrane thickness of, for example, 10 μm~200 μm may be used as the diaphragm 11.

The lid portion 1b seals the container 1a. A holding component 16 that holds a working electrode 4 and a counter electrode 5 is provided on a substantially central portion of the lid portion 1b so as to protrude outwards on the container 1a side thereof. In a state in which the lid portion 1b is attached to the container 1a, this holding component 16 is housed in a space formed between the container 1a and the lid portion 1b. Moreover, a connector portion 6 to which is attached a cable that is used to connect an external device is provided on the opposite side of the lid portion 1b from the container 1a side.

Figure 3:
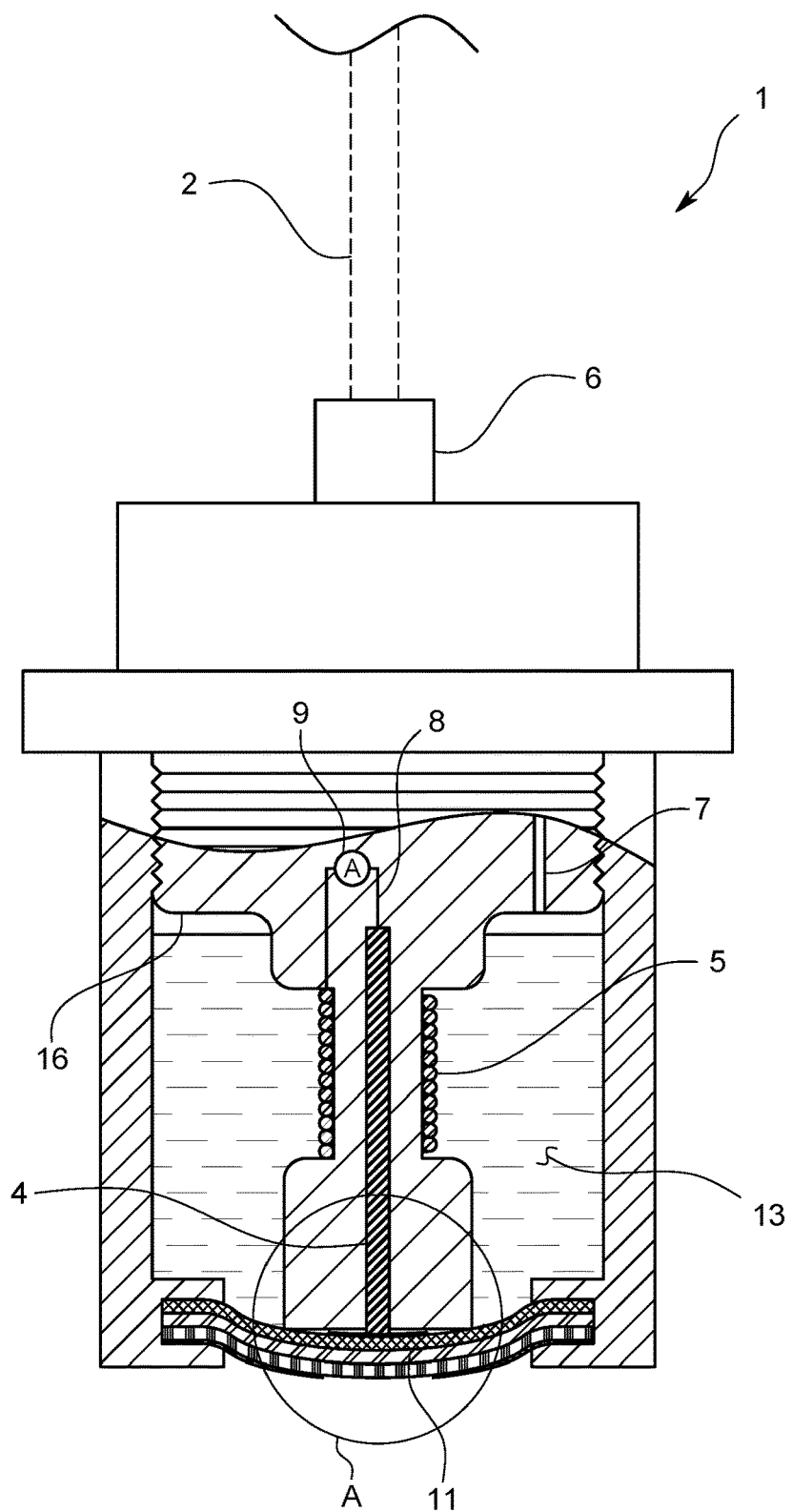
FIG. 3 is a schematic cross-sectional view of the peracetic acid concentration meter according to an embodiment of the present invention.

The holding component 16 is formed from a non-conductive material. As is shown in FIG. 3, the holding component 16 holds the working electrode 4 by encircling the periphery of the working electrode 4, and holds the counter electrode 5 as a result of the counter electrode 5 being wound around the periphery of the holding component 16. A spiral shaped groove that is used to attach the lid portion 1b to the container 1a is provided on the holding component 16. As a result of this spiral shaped groove being engaged with the screw thread (not shown in the drawings) provided on the container 1a side, the lid portion 1b can be attached to the container portion 1a. Furthermore, an air hole 7 that is used to expel gas to the outside is provided in the holding component 16. Note that a filter that is used to separate gases from liquids is provided at an opening at one end of this air hole 7.

Figure 4:
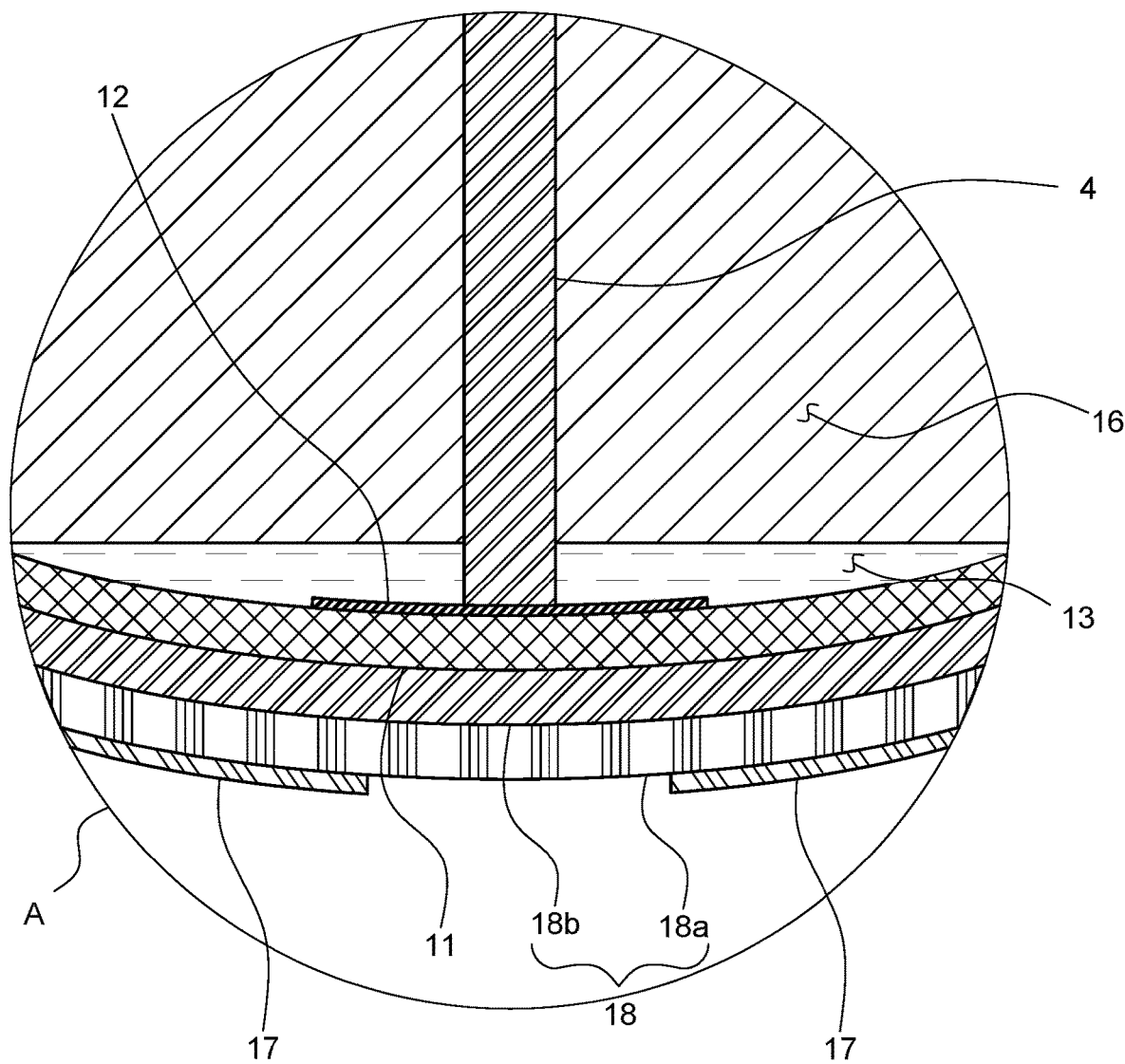
FIG. 4 is an enlarged cross-sectional view showing an enlargement of a portion A shown in FIG. 3 according to an embodiment of the present invention.
Figure 5:
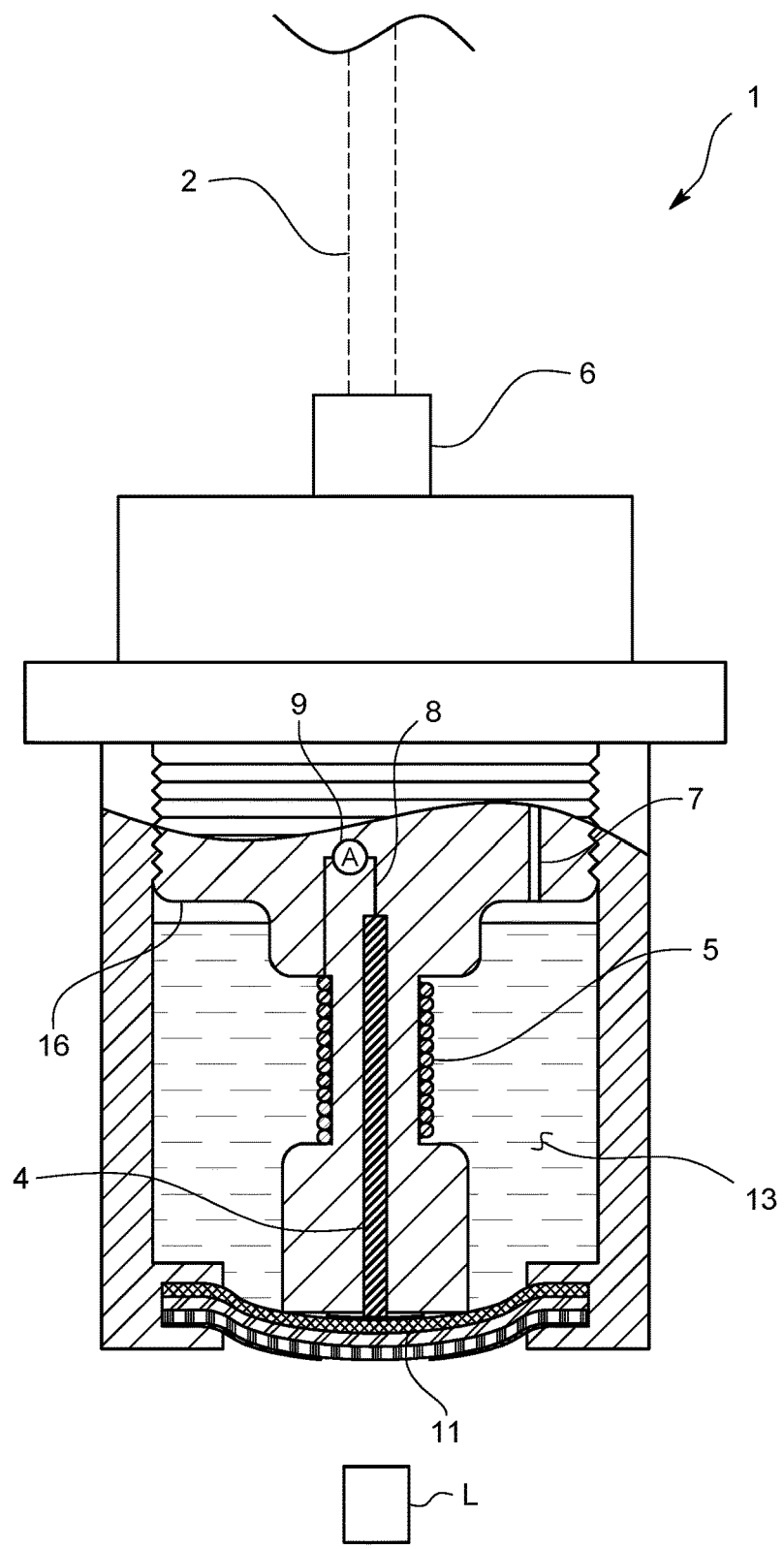
FIG. 5 is a schematic cross-sectional view of a peracetic acid concentration meter according to another embodiment of the present invention.

The working electrode 4 is formed from an electrically conductive material such as, for example, gold or platinum or the like and, in the present embodiment, as is shown in FIG. 2 and FIG. 3, is formed in a rod shape. As is shown in FIG. 4, the working electrode 4 is positioned such that one end thereof protrudes slightly beyond a distal end surface 10 of the holding component 16. In addition, minute bumps and indentations (not shown in the drawings) are provided on a surface of this working electrode 4.

The counter electrode 5 is formed from an electrically conductive material such as, for example, platinum or silver/silver chloride (Ag/AgCl) or the like and, in the present embodiment, is formed in a linear shape.

As is shown in FIG. 3, the working electrode 4 and the counter electrode 5 are mutually connected via a conductive wire 8, and voltage from an externally provided power supply device (not shown in the drawings) is applied via this conductive wire 8 to the working electrode 4 and the counter electrode 5. In addition, an ammeter 9 that detects current flowing through the conductive wire 8 is provided on the conductive wire 8. Note that it is also possible for the conductive wire 8 and the ammeter 9 to be provided externally of the lid portion 1b.

As is shown in FIG. 1 and FIG. 3, in a state in which the lid portion 1b has been attached to the container 1a, the internal solution 13 is contained in the space formed between the lid portion 1b and the container 1a.

This internal solution 13A is a buffer solution having a buffering action towards a hydrogen ion concentration, and does not contain any substance that reacts with peracetic acid. In the present embodiment, the internal solution 13 is formed solely by a buffer solution. Provided that this buffer solution is used, then the buffer solution is not particularly limited, and an acidic buffer solution, a neutral buffer solution, or an alkaline buffer solution or the like may be used. However, it is preferable that an acidic buffer solution or a neutral buffer solution be used. In the present embodiment, for example, a phosphate buffer solution, a peracetic acid buffer solution, tris, a boric acid buffer solution, or a citric acid buffer solution or the like may be used.

An intermediate membrane 12 having wettability towards the internal solution 13 is laminated onto the diaphragm 11 that is disposed on the inner side of the container 1a. In a state in which the container 1a is attached to the lid portion 1b, this intermediate membrane 12 is disposed between the diaphragm 11 and the working electrode 4 so that the working electrode 4 is in contact with the diaphragm 11 via this intermediate membrane 12. Here, the term 'wettability' shows that there is affinity between the intermediate membrane 12 and the internal solution 13, and that the nature of the intermediate membrane 12 enables the internal solution 13 to accumulate in the intermediate membrane 12 and cause the intermediate membrane 12 to become wet, and consequently causes a liquid layer to be formed by the internal solution 13 on the surface of the intermediate membrane 12. An intermediate diaphragm having a membrane thickness of, for example, 1 µm~200 µm may be used as the intermediate membrane 12.

A material having a greater modulus of elasticity than the modulus of elasticity of the diaphragm 11 may be used for the intermediate membrane 12. For example, materials formed from polymers and the like and, in particular, polycarbonate, polytetrafluoroethylene (PTFE), resin mixtures obtained by mixing polyethylene and polyimide, polyimide, and cellulose and the like may be used.

The intermediate membrane 12 is formed by a porous membrane in which are provided countless micro holes 12a having a hole diameter of between 0.05 µm and 100 µm that is sufficiently smaller than the size of the gas bubbles (which are 500 µm or greater) of oxygen or the like.

Moreover, a protective membrane 17 is laminated onto the diaphragm 11 that is disposed on the outer side of the container 1a so as to avoid areas where the diaphragm 11 is in contact with the intermediate membrane 12. The material used to form this protective membrane 17 is not particularly restricted and, for example, polypropylene, PFA, or PET, or the like may be used. Note that it is desirable that the protective membrane 17 be formed from a material having a comparatively high degree of hardness that is essentially non-permeable to sub stances.

Additionally, the peracetic acid concentration meter 1 according to the present embodiment is provided with a permeation-inhibiting layer 18 that is laminated in such a way as to cover the entire surface of the diaphragm on the side thereof that is in contact with the test solution, and that inhibits the permeation of organic materials.

This permeation-inhibiting layer 18 is provided, for example, with a semipermeable membrane 18a, and a supporting substrate 18b that supports the semipermeable membrane 18a.

The semipermeable membrane 18a may be formed from a material that does not obstruct the permeation of peracetic acid, but is able to function as a molecular sieve so as to inhibit the permeation of organic material, and a membrane containing one or more types of components selected from a group that includes, for example, ion exchange membranes such as cellulose, acetyl cellulose, and polyacrylonitrile, polytetrafluoroethylene, polyester-based polymer alloys, and polysulfones may be used as the semipermeable membrane 18a.

The thickness of the semipermeable membrane 18a may be within a range of between not less than 1 nm and not more than 50 µm, and is preferably within a range of between not less than 2 nm and not more than 30 µm.

The supporting substrate 18b may be a substrate that does not obstruct the permeation of peracetic acid and a porous membrane or the like containing a resin such as, for example, polyethylene, polytetrafluoroethylene, polyphenylene sulfide, or porous polypropylene or the like may be used for the supporting substrate 18b. The size of the apertures formed in this porous membrane may be, for example, between not less than 10 nm and not more than 200 nm. In order to prevent the permeation of the peracetic acid from being obstructed, it is preferable that the thickness of the supporting substrate 18b be made as thin as possible, and this thickness may be, for example, between not less than 5 µm and not more than 300 µm. Preferably, the thickness of the supporting substrate 18b is not less than 10 µm and not more than 50 µm, and even more preferably is not less than 10 µm and not more than 20 µm.

A method of manufacturing the above-described peracetic acid concentration meter 1 and, in particular, a method of laminating the above-described permeation-inhibiting layer 18 onto the diaphragm 11 will now be described.

Here, as an example, a case is described in which an acetyl cellulose membrane is used as the semipermeable membrane 18a.

Firstly, the porous supporting substrate 18b which is formed, for example, from polyethylene is laminated onto the surface of the diaphragm 11 on the side thereof that is in contact with the test solution.

Next, the liquid composition for the semipermeable membrane is prepared by dissolving acetyl cellulose in a medium such as acetone or cyclohexane.

The permeation-inhibiting layer 18 is manufactured by coating this semipermeable membrane liquid composition onto the surface of the above-described porous supporting substrate 18b, using, for example, a 50 µm roller coater or the like, and then drying the semipermeable membrane liquid composition.

Thereafter, the diaphragm 11 and the permeation-inhibiting layer 18 are fixed by the above-described protective membrane 17.

An operation of the peracetic acid concentration meter 1 that is formed in this manner will now be described.

When the lid portion 1b is attached to the container 1a, as is shown in FIG. 4, the working electrode 4 is in contact with the diaphragm 11 via the intermediate membrane 12. More specifically, because the working electrode 4 is disposed so as to protrude from the distal end surface 10, the working electrode 4 is in press-contact with the diaphragm 11 via the intermediate membrane 12.

Moreover, the internal solution 13 is sealed between the container 1a and the lid portion 1b. As is shown in FIG. 4, this sealed-in internal solution 13 penetrates into the micro spaces between the diaphragm 11 and the intermediate membrane 12, and the micro spaces between the intermediate membrane 12 and the working electrode 4. Here, because the intermediate membrane 12 has wettability towards the internal solution 13, a liquid layer of the internal solution 13 is formed on the surface of the intermediate membrane 12. In addition, because the intermediate membrane 12 is a porous membrane, the internal solution 13 also penetrates into the interior of the intermediate membrane 12 through the micro holes 12a that are provided in the intermediate membrane 12. Because of this, although the working electrode 4 is in contact with the intermediate membrane 12 via this liquid layer, and the intermediate membrane 12 is also in contact with the diaphragm 11 via the liquid layer, because the liquid layer is an extremely thin layer, essentially the working electrode 4 can be regarded as being in contact with the diaphragm 11 via the intermediate membrane 12.

In addition, because the working electrode 4 is immersed in the internal solution 13 and the counter electrode 5 is also immersed in the internal solution 13, the working electrode 4 and the counter electrode 5 are electrically connected to each other via the internal solution 13.

When the above-described peracetic acid concentration meter 1 is immersed in a test solution, specific substances such as peracetic acid, hydrogen peroxide, dissolved oxygen, and residual chlorine and the like that are contained in the test solution permeate through the diaphragm 11, and these specific substances are dissolved in the internal solution 13 that is being held in the space formed between the container 1a and the lid portion 1b. When voltage is then applied to a point between the working electrode 4 and the counter electrode 5 via the conductive wiring 8 from the power supply device (not shown in the drawings), the peracetic acid undergoes an oxidation-reduction reaction at the surface of the working electrode 4, and an oxidation-reduction reaction is generated at the surface of the counter electrode 5. Because a current is made to flow in the conductive wire 8 by these reactions, if the value of this current is measured by the ammeter 9, it becomes possible to detect the peracetic acid concentration.

Note that it is also possible, for example, to connect the connector portion 6 of the peracetic acid concentration meter 1 to an external device via a cable or the like, and to transmit an output signal that shows the current values measured by the ammeter 9 to this external device. The concentration of the peracetic acid may then be calculated by the external device.

According to the peracetic acid concentration meter 1 that is formed in the manner described above, the following effects can be demonstrated.

Because the permeation-inhibiting layer 18 that inhibits the permeation of organic material is laminated onto the surface of the diaphragm 11 on the side thereof that is in contact with the test solution without obstructing the permeation of peracetic acid, it is possible to inhibit permeation through the diaphragm 11 of organic material that is contained in the test solution.

As a result, because it is possible to reduce the possibility of the surface of the working electrode 4 becoming contaminated by organic material, the accuracy of a peracetic acid concentration measurement can be improved in comparison with the conventional technology.

Because the permeation-inhibiting layer 18 is provided with an acetyl cellulose membrane as the semipermeable membrane 18a, it is possible to inhibit the permeation of substances having a molecular weight of 200 Da or more. Because of this, it is possible to more reliably inhibit the permeation of macromolecular organic material that might become a cause of contamination of a surface of a working electrode.

If a semipermeable membrane liquid composition that contains acetyl cellulose is coated directly onto the surface of the diaphragm 11, then the semipermeable membrane liquid composition is repelled by the surface of the diaphragm 11 and it is difficult for an acetyl cellulose membrane to be formed.

For this reason, in the peracetic acid concentration meter 1 according to the present embodiment, the permeation-inhibiting layer 18 is provided with the supporting substrate 18b that supports the semipermeable membrane, and a material that does not repel a semipermeable membrane liquid composition containing acetyl cellulose is selected as the material used for this supporting substrate 18b.

Because of this, if the supporting substrate 18b is firstly laminated onto the surface of the diaphragm 11, and then a semipermeable membrane liquid composition containing acetyl cellulose is subsequently coated onto the surface of this supporting substrate 18b, then the permeation-inhibiting layer 18 can be laminated easily onto the diaphragm 11.

Note that it is also possible to prepare the semipermeable membrane 18 in advance by firstly coating a semipermeable membrane liquid composition containing acetyl cellulose onto the surface of the supporting substrate 18b, and then drying this semipermeable membrane liquid composition. The resulting semipermeable membrane 18 is then laminated onto the surface of the diaphragm 11 of the peracetic acid concentration meter 1 on the side thereof that comes into contact with the test solution in such a way that the supporting substrate 18b and the diaphragm 11 are in mutual contact with each other.

Because the working electrode 4 is in contact with the diaphragm 11 via the intermediate membrane 12, while the distance between the working electrode 4 and the diaphragm 11 can be shortened, the working electrode 4 can be prevented by the intermediate membrane 12 from coming into actual contact with the diaphragm 11 without any gap between them. In addition, because the intermediate membrane 12 has wettability towards the internal solution 13 so that a liquid layer is formed by the internal solution 13 on a surface of the intermediate membrane 12, it is possible to supply a specific substance that has been dissolved in the internal solution 13 from this liquid layer to the surface of the working electrode 4. Because of this, at the same time as the distance between the diaphragm 11 and the working electrode 4 is shortened so as to obtain improved sensor responsiveness, the reaction at the surface of the working electrode 4 is prevented from being obstructed, and it is possible to thereby prevent the sensitivity of the sensor from deteriorating.

Moreover, in the present embodiment, minute bumps and indentations are provided on the surface of the working electrode 4 and these minute bumps and indentations increase the specific surface area of the working electrode 4 that is in contact with the internal solution 13. As a result, it is possible to further improve the responsiveness of the reaction at the surface of the working electrode 4.

Furthermore, because the internal solution 13 in which a specific substance has been dissolved is supplied to the surface of the working electrode 4 through the micro holes 12a provided in the intermediate membrane 12, it is possible to further shorten the distance traveled by the peracetic acid to reach the surface of the working electrode 4 so that the responsiveness at the surface of the working electrode 4 can be improved even further. Moreover, because the internal solution 13 is able to be supplied to the surface of the working electrode 4 through the micro holes 12a, the detection of the peracetic acid is extremely stable.

Furthermore, because the hole diameter of the micro holes 12a in the porous membrane is between 0.05 μm and 100 μm, even in a case in which gas bubbles are generated inside the sensor, these gas bubbles are sufficiently larger in size than the micro holes 12a so that they do not remain behind inside the micro holes 12a. Because of this, the micro holes 12a are not blocked by gas bubbles, and the internal solution 13 can be supplied through the micro holes 12a to the surface of the working electrode 4. As a consequence, it is possible to prevent the sensor sensitivity from deteriorating.

Specific descriptions will now be given of the above-described effects.

In a conventional diaphragm-type peracetic acid concentration meter there have been cases in which gas bubbles that are contained in a test solution or that have adhered to a sensor permeate through the diaphragm 11, which is permeable to gas, and have penetrated into the sensor interior. Additionally, there have been cases in which gas bubbles are generated by an oxidation-reduction reaction at the surface of the working electrode 4. These gas bubbles remain between the working electrode 4 and the diaphragm 11 and cause various problems to occur such as the reaction at the surface of the working electrode 4 being obstructed, and the sensor sensitivity deteriorating.

In a case in which peracetic acid contained in a test solution is being measured, because the peracetic acid decomposes naturally so as to generate oxygen, and because oxygen is also generated by the oxidation-reduction reaction, it is unavoidable that gas bubbles will be generated within the sensor, and that the sensitivity of the sensor will deteriorate.

However, because the peracetic acid concentration meter 1 of the present embodiment is equipped with the intermediate membrane 12 that is formed by a porous membrane, and because the hole diameter of the micro holes 12a in this porous membrane is sufficiently smaller than the size of the gas bubbles of oxygen or the like (which are 500 µm or greater), gas bubbles are prevented from remaining in the intermediate membrane 12. As a result, because the reaction at the surface of the working electrode 4 is not obstructed by gas bubbles, it is possible to prevent the sensor sensitivity from deteriorating due to these gas bubbles being generated.

Moreover, in the peracetic acid concentration meter 1 of the present embodiment, because the modulus of elasticity (i.e., the volume modulus of elasticity) of the intermediate membrane 12 is greater than the modulus of elasticity of the diaphragm 11, compared to the diaphragm 11 it is difficult for the intermediate membrane 12 to be deformed. Consequently, the actual intermediate membrane 12 itself is reliably prevented from coming into close contact with the surface of the working electrode 4, and the responsiveness at the surface of the electrode 4 can be improved.

Furthermore, because the working electrode 4 is in press-contact with the diaphragm 11 via the intermediate membrane 12, it is possible to shorten the distance between the working electrode 4 and the diaphragm 11 even more, and to further improve the responsiveness at the surface of the working electrode 4.

In addition, because the air hole 7 is provided in the holding component 16, internal pressure that is generated when the lid portion 1b is attached to the container 1a is able to escape via this air hole 7 and, as is described above, even in a case in which gas bubbles (i.e., gas) are generated inside the sensor, these gas bubbles are able to escape through this air hole 7 so that sensor failure can be prevented.

Moreover, because the protective membrane 17 is provided on the surface of the diaphragm 11 that is in contact with the test solution except for those areas where the diaphragm 11 is in contact with the intermediate membrane 12, it is possible to prevent the diaphragm 11 from being damaged by the protective membrane 17, and it is also possible to prevent the internal solution 13 from leaking onto the test solution side. Additionally, because a protective membrane 17 having a comparatively high degree of hardness is used, it is possible to even more reliably prevent the diaphragm 11 from being damaged. Moreover, impurities or the like in a test solution can be prevented from penetrating into the internal solution 13 via the diaphragm 11, and this enables the detection accuracy to be increased. Furthermore, provided that the protective membrane 17 is formed from a material that has sufficient density so as to make it essentially impermeable to substances, then because this protective membrane 17 inhibits the permeation of substances, it is possible to more reliably prevent the internal solution 13 from leaking onto the test solution side, and to more reliably prevent impurities and the like present in the test solution from penetrating into the interior of the internal solution 13 via the diaphragm 11.

Furthermore, by forming the intermediate membrane 12 from a polymer or the like, and particularly by using a polycarbonate, it is possible to further improve the responsiveness of the working electrode 4.

Various modifications and the like may be made to the present invention insofar as these do not depart from the spirit or scope of the present invention.

For example, in the above-described embodiment, an example is described in which the permeation-inhibiting layer 18 is provided with the semipermeable membrane 18a and the supporting substrate 18b, however, in a case in which it is possible both for the semipermeable membrane 18a to be laminated directly onto the surface of the diaphragm 11, and for sufficient strength to enable the resulting membrane structure to be maintained to be guaranteed, then it is possible for the supporting substrate 18b to be omitted.

It is also possible for the above-described peracetic acid concentration meter 1 to be incorporated into a peracetic acid concentration measurement device that is provided with the above-described conductive wire 8 and ammeter 9, and with a calculating portion that receives signals output from the ammeter 9 and subsequently calculates a peracetic acid concentration, and a display unit that displays the peracetic acid concentration calculated by the calculating portion, and the like. These functions of the calculating portion and display portion and the like may be implemented by a computer that is provided with, for example, an amplifier, an A/D converter, a CPU, memory, communication ports, and a display and the like operating in accordance with a predetermined program.

This type of peracetic acid concentration measurement device may be further provided with a light source L that irradiates ultraviolet light from the outside onto the casing of the peracetic acid concentration meter 1, and onto the surface of the permeation-inhibiting layer 18 on the side thereof that is in contact with the test solution.

The light source L may be, for example, an LED chip (i.e., a light-emitting diode chip) that emits light having a predetermined wavelength of approximately 400 nm or less or, more preferably, of 370 nm or less.

It is sufficient if the light emitted from the light source L has a wavelength of approximately 500 nm or less and this light may be, for example, blue light having a wavelength of 500 nm or less, or violet light having a wavelength of 430 nm or less.

In the present embodiment, it is sufficient if the ultraviolet light emitted from the light source L has a sufficient intensity to enable a measurement of, for example, approximately 8 mW/cm$^2$ to be obtained for this light at a position on the outer surface of the permeation-inhibiting layer 18.

More specifically, it is sufficient if the light source L is able to emit light having an intensity of approximately not less than 1 mM/cm$^2$ and not more than 15 mW/cm$^2$ or, more preferably, light having an intensity of approximately not less than 2 mW/cm$^2$ and not more than 12 mW/cm$^2$.

Instead of providing the separate protective membrane 17 in order to protect the diaphragm, it is also possible, for example, for a distal end portion of the above-described container 1a to function as a protective component by covering the diaphragm 11 except for those areas where the diaphragm 11 is in contact with the intermediate membrane 12.

EXAMPLES

The present invention will now be described in further detail giving specific examples, however, it is to be noted that the present invention is not limited solely to these examples.

In these examples, the effects on the sensitivity of a peracetic acid concentration meter obtained when a permeation-inhibiting layer was provided and also when this permeation-inhibiting layer was not provided were examined using a simulation sample containing organic material.

Example 1

In Example 1, a peracetic acid concentration meter in which the permeation-inhibiting layer was provided on the test solution side of the diaphragm was employed. As the permeation-inhibiting layer, a layer provided with a supporting substrate that was laminated onto a surface of the diaphragm, and with a semipermeable membrane that was supported on the supporting substrate was employed. In the present example, a polyethylene membrane was used as the supporting substrate, while an acetyl cellulose membrane was used as the semipermeable membrane. An average thickness of the polyethylene membrane at this time was set to 100 μm, while an average thickness of the acetyl cellulose membrane was set to 2-3 nm. Moreover, a silicon membrane was used for the diaphragm, a polypropylene membrane was used for the protective membrane, and a polycarbonate membrane was used for the intermediate membrane.

As the simulation sample, 0.4% peracetic acid, and an aqueous solution containing 10 ppm of C16 saturated fatty acid and 10 ppm of C18 saturated fatty acid were used.

The peracetic acid concentration of this simulation sample was measured continuously for five days, and changes in the sensitivity of the peracetic acid concentration measurement were examined. The temperature of all the simulation samples was set to 25° C.

The peracetic acid concentration of the same simulation sample as that measured by the peracetic acid concentration meter according to the present example was measured in parallel using a desktop peracetic acid monitor. Changes in the sensitivity of the peracetic acid concentration meter were then calculated by comparing the peracetic acid concentration measured by the peracetic acid concentration meter with the peracetic acid concentration measured by the desktop peracetic acid monitor. This test was performed twice.

As the desktop peracetic acid monitor, an RK-PDXII monitor manufactured by Ricoh Kyosan that measures peracetic acid concentrations using a reaction between peracetic acid and iodine was used.

The results showed that, after five days, the sensitivity had reduced by −6% in the first test compared to the initial measurement, and by −7% in the second test. In both tests, this reduction in sensitivity was within ±7% of the measurement error range of the desktop peracetic acid monitor which was obtained via evaluations performed in advance.

Comparative Example 1

Next, using a peracetic acid concentration meter that differed from the peracetic acid concentration meter of the above-described Example 1 only in the fact that no permeation-inhibiting layer was provided, the peracetic acid concentration of the simulation sample was measured continuously for five days in the same way as in Example 1. The peracetic acid concentration was then compared with the peracetic acid concentration measured using the above-described desktop peracetic acid monitor, and changes in the sensitivity of the peracetic acid concentration measurement were examined.

The results showed that, after five days, the sensitivity had reduced by −51% in the first test, and by −26% in the second test. In both tests, the reduction in sensitivity was markedly greater than that seen in Example 1.

Because the peracetic acid concentration meters of Example 1 and Comparative Example 1 only differed from each other in whether or not the permeation-inhibiting layer was provided, it can be considered that the above-described changes in the sensitivity of the peracetic acid concentration meter also resulted from whether or not the permeation-inhibiting layer was provided.

Accordingly, from the results obtained from Example 1 and Comparative Example 1, it was found that, by providing the permeation-inhibiting layer in the peracetic acid concentration meter of Example 1, even if a test sample containing organic material is continuously measured for a prolonged period, there are substantially no changes in the sensitivity of the peracetic acid concentration meter.

In a peracetic acid concentration meter that is provided with the permeation-inhibiting layer, because it is possible to inhibit organic material contained in a test solution from being mixed into the internal solution, contamination of the working electrode surface is inhibited, and it is thought that the sensitivity of the measurement of the peracetic acid concentration is stabilized as a result of this.

INDUSTRIAL APPLICABILITY

According to the peracetic acid concentration meter of the present invention, it is possible to inhibit contamination of the surface of a working electrode by organic material derived from a test solution, and to measure a peracetic acid concentration more accurately than is possible conventionally.

While preferred embodiments of the invention have been described and illustrated above, it should be understood that these are exemplary of the invention and are not to be considered as limiting. Additions, omissions, substitutions, and other modifications may be made without departing from the spirit or scope of the present invention. Accordingly, the invention is not to be considered as limited by the foregoing description and is only limited by the scope of the appended claims.

What is claimed is:
1. A diaphragm-type peracetic acid concentration meter that measures a peracetic acid concentration in a test solution comprising:
  a diaphragm that is permeable to peracetic acid;
  an internal solution in which peracetic acid that has permeated through the diaphragm is dissolved;
  a working electrode and a counter electrode that are immersed in the internal solution; and
  a permeation-inhibiting layer that is laminated onto a surface of the diaphragm on a side thereof that is in contact with the test solution, and that inhibits permeation of organic material, wherein
  the permeation-inhibiting layer is provided with a semipermeable membrane; and
  the permeation-inhibiting layer is further provided with a supporting substrate that supports the semipermeable membrane, wherein
  in the permeation-inhibiting layer, the supporting substrate is laminated onto a surface of the diaphragm on a side thereof that is in contact with the test solution, while the semipermeable membrane is laminated onto a surface of the supporting substrate on the opposite side from the diaphragm.
2. The peracetic acid concentration meter according to claim 1, wherein the supporting substrate is a porous membrane.

3. The peracetic acid concentration meter according to claim 1, wherein the semipermeable membrane is a membrane containing one or more types of components selected from a group made up of cellulose, acetyl cellulose, polyacrylonitrile, polytetrafluoroethylene, polyester-based polymer alloys and polysulfones.

4. A peracetic acid concentration measurement device comprising the peracetic acid concentration meter according to claim 1.

5. The peracetic acid concentration measurement device according to claim 4, further comprising a light source that irradiates ultraviolet light onto a surface of the peracetic acid concentration meter that is in contact with the test solution.

* * * * *